(12) United States Patent
Klestil

(10) Patent No.: US 9,870,020 B2
(45) Date of Patent: Jan. 16, 2018

(54) ACCELERATOR PEDAL UNIT

(71) Applicant: Robert Bosch GmbH, Stuttgart (DE)

(72) Inventor: Pavel Klestil, Srubec (CZ)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 14/762,548

(22) PCT Filed: Jan. 8, 2014

(86) PCT No.: PCT/EP2014/050196
§ 371 (c)(1),
(2) Date: Jul. 22, 2015

(87) PCT Pub. No.: WO2014/117965
PCT Pub. Date: Aug. 7, 2014

(65) Prior Publication Data
US 2015/0323953 A1 Nov. 12, 2015

(30) Foreign Application Priority Data

Jan. 29, 2013 (DE) .......................... 10 2013 201 378
Mar. 26, 2013 (DE) .......................... 10 2013 205 281

(51) Int. Cl.
*G05G 1/30* (2008.04)
*G05G 5/03* (2008.04)
(Continued)

(52) U.S. Cl.
CPC ............. *G05G 5/03* (2013.01); *B60K 26/021* (2013.01); *G05G 1/44* (2013.01); *Y10T 74/20006* (2015.01); *Y10T 74/20528* (2015.01)

(58) Field of Classification Search
CPC ............ G05G 1/30; G05G 1/44; G05G 1/445; G05G 1/46; G05G 5/03; G05G 5/05;
(Continued)

(56) References Cited

U.S. PATENT DOCUMENTS

| 4,109,529 A | * | 8/1978 | Niklaus | ..................... B60T 7/04 188/106 R |
| 4,944,269 A | * | 7/1990 | Imoehl | ................. B60K 26/021 123/399 |
| 5,408,899 A | * | 4/1995 | Stewart | ................ B60K 26/021 123/399 |

(Continued)

FOREIGN PATENT DOCUMENTS

| DE | 10250456 | 2/2004 |
| DE | 102009021585 | 12/2010 |

(Continued)

OTHER PUBLICATIONS

International Search Report for Application No. PCT/EP2014/050196 dated Apr. 30, 2014 (English Translation, 2 pages).

*Primary Examiner* — Adam D Rogers
(74) *Attorney, Agent, or Firm* — Michael Best & Friedrich LLP

(57) ABSTRACT

An accelerator pedal unit is known comprising an accelerator pedal, an actuator, and a control shaft via which the actuator can transmit a restoring torque to the accelerator pedal. The accelerator pedal unit can generate an additional restoring force which acts on the accelerator pedal, for example in order to regulate or limit the speed of a vehicle or to function as a warning device in the event of speeding. In the accelerator pedal unit according to the invention, the actuator is mechanically decoupled from the accelerator pedal. According to the invention, the torque of the control shaft (3) is transmitted to the accelerator pedal (1) via a damping element (10).

12 Claims, 2 Drawing Sheets

(51) Int. Cl.
*B60K 26/02* (2006.01)
*G05G 1/44* (2008.04)

(58) Field of Classification Search
CPC ......... Y10T 74/20006; Y10T 74/20528; Y10T 74/20534; B60K 26/021; B60K 2026/023
See application file for complete search history.

(56) References Cited

U.S. PATENT DOCUMENTS

| | | | | |
|---|---|---|---|---|
| 5,819,595 | A * | 10/1998 | Cebollero | B60T 7/105 |
| | | | | 74/535 |
| 6,019,016 | A * | 2/2000 | Takagi | B60K 26/02 |
| | | | | 123/399 |
| 6,332,374 | B1 | 12/2001 | Someda et al. | |
| 7,770,491 | B2 * | 8/2010 | Ritter | B60K 26/021 |
| | | | | 74/560 |
| 7,779,721 | B2 * | 8/2010 | Yokoyama | B60K 26/021 |
| | | | | 74/512 |
| 9,182,774 | B2 * | 11/2015 | Drews | B60K 26/021 |
| 2012/0096976 | A1 | 4/2012 | Leone et al. | |
| 2012/0167708 | A1 * | 7/2012 | Brandt | B60K 26/021 |
| | | | | 74/513 |

FOREIGN PATENT DOCUMENTS

| | | | |
|---|---|---|---|
| DE | 102010029199 | 12/2010 | |
| DE | WO 2016083011 A2 * | 6/2016 | ............. B60K 26/02 |
| JP | 2012171475 A | 9/2012 | |
| JP | 2013014259 A | 1/2013 | |
| WO | 2005124500 A1 | 12/2005 | |

* cited by examiner

ACCELERATOR PEDAL UNIT

BACKGROUND OF THE INVENTION

The invention relates to an accelerator pedal unit comprising an accelerator pedal, an actuator and a control shaft via which the actuator can transmit a restoring torque to the accelerator pedal.

An accelerator pedal unit is already known from the German patent publication DE 10 2009 021 585 A1, comprising an accelerator pedal, an actuator and a control shaft, by means of which a restoring torque can be transmitted to the accelerator pedal. The accelerator pedal unit can generate an additional restoring force which acts on the accelerator pedal, for example in order to regulate or limit the speed of a vehicle or to function as a warning device in the event of speeding. Disadvantageously, the actuator and the accelerator pedal are rigidly coupled to each other. As a result, brief losses of torque of the actuator, for example losses of torque of a brushed DC electric motor (torque ripple), are transmitted to the accelerator pedal with no change in their relative magnitude and are noticeable to the driver in a disruptive manner. A further disadvantage is that the additional restoring force generated by the actuator is subject to uncontrollable fluctuations due to different effects. Firstly, an undesirable increase in the restoring force can occur due to inertia forces as a result of coupled co-movement of the actuator during a quick actuation of the accelerator pedal. Secondly, the mechanical gearing mechanism path is afflicted with friction, so that the force actually transmitted to the accelerator pedal is dependent on temperature. Moreover, the relationship between the generated engine torque and the current applied to the actuator is subject to unpredictable fluctuations which are dependent on temperature and material and component tolerances.

SUMMARY OF THE INVENTION

The accelerator pedal unit according to the invention has in contrast the advantage that the actuator is mechanically decoupled from the accelerator pedal by the torque of the control shaft being transmitted via a damping element to said accelerator pedal. From a mechanical perspective, a spring or damping element is thus disposed between the control shaft and the accelerator pedal. Torque fluctuations of the actuator which occur are damped to a great extent by the damping element, so that said fluctuations are unnoticeable to the driver.

According to one advantageous embodiment, the damping element is designed as a helical spring, torsion spring, flexible spring or rubber spring.

It is particularly advantageous if a control lever for transmitting the torque is provided on the control shaft, wherein the damping element is connected at one end to the control lever and at the other end to the control shaft.

It is furthermore advantageous for the control lever to be rotatably mounted on the control shaft because the restoring torque is transmitted in this way exclusively via the dampening element.

It is very advantageous for the damping element to be attached with the end thereof associated with the control shaft to a shoulder connected to said control shaft because the damping element can be attached particularly easily to said control shaft in this way.

It is also advantageous for the damping element to extend around the control shaft with at least one winding because the damping element can thereby be disposed in a very space saving manner.

It is furthermore advantageous for the control lever to comprise a rotatably mounted rolling element because the torque can be transmitted with little friction from the control lever to the accelerator pedal in this way.

In addition, it is advantageous for the control lever to act on a surface of the accelerator pedal which is provided with a coating because the torque can be transmitted in this way form the control lever to the accelerator pedal in a practically frictionless and low-noise manner.

It is advantageous for a positioning spring to be provided which is attached with the one end thereof to a rotationally fixed housing section and acts with the other end on the control lever. The positioning spring ensures a bracing of a gearing mechanism disposed between the actuator and the accelerator pedal independently of the effective direction thereof; thus enabling the tooth flanks of the teeth of the gearing mechanism to fit tightly against each other. In so doing, there is little noise during the operation of the gearing mechanism.

In addition, it is advantageous for the positioning spring to be designed in such a manner that said spring pushes the control lever towards the accelerator pedal or in the opposite direction into a stop position that is spaced apart from the accelerator pedal. According to the first alternative, the positioning spring acts as a restoring spring against the spring force of the damping element. According to the second alternative, the positioning spring acts in the direction of the damping element and ensures that the control lever is constantly in contact with the accelerator pedal, whereby the actuator can very quickly introduce a force into the accelerator pedal.

It is furthermore advantageous for the damping element and the positioning spring to each be provided on a bearing bushing that is rotationally mounted on the control shaft. In this way, it is ensured that the springs are well guided and cannot break out in an undefined manner when subjected to a mechanical load.

BRIEF DESCRIPTION OF THE DRAWINGS

An exemplary embodiment of the invention is depicted in a simplified manner in the drawings and is explained in detail in the following description. In the drawings.

DETAILED DESCRIPTION

Figure 1:
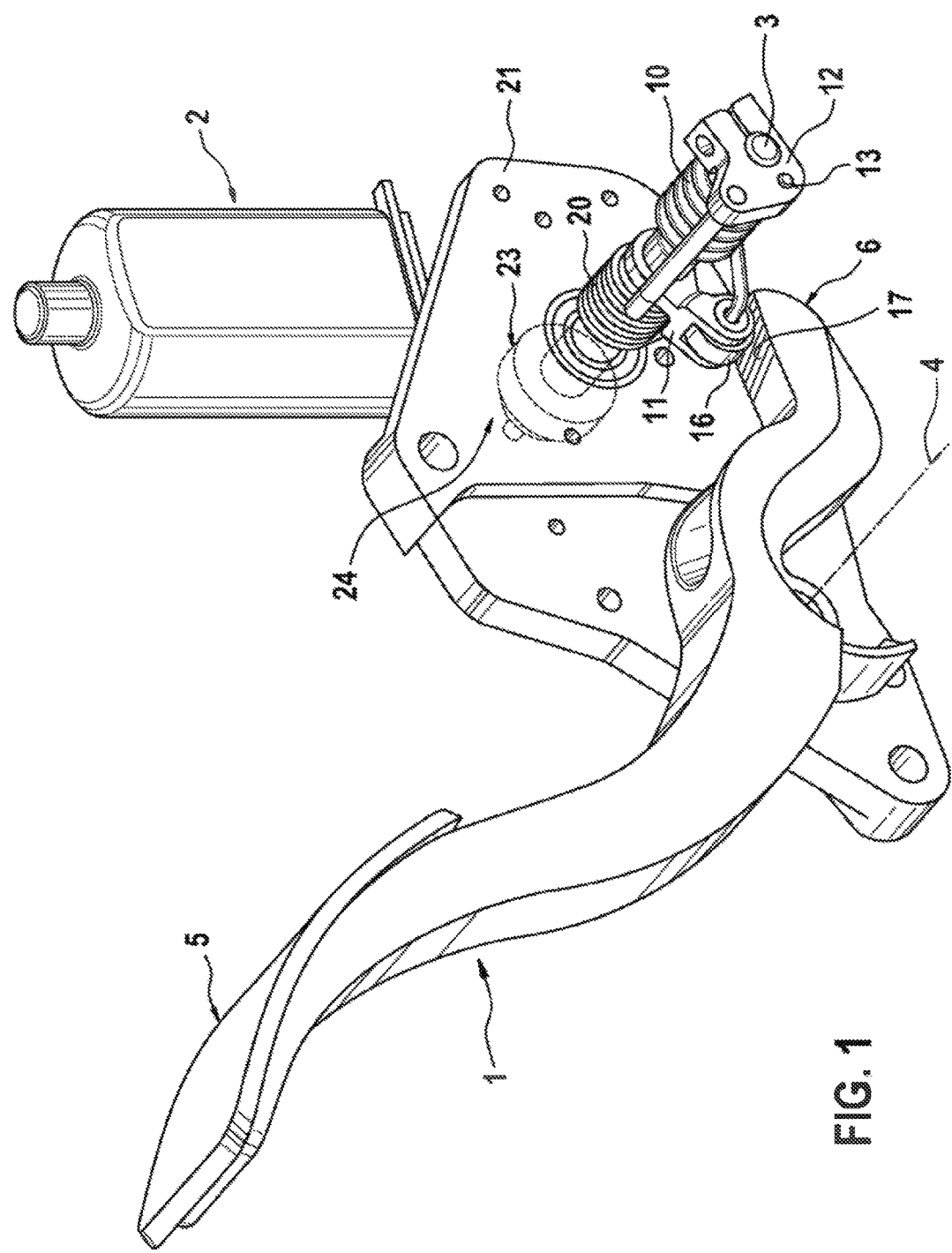
FIG. 1 shows an accelerator pedal unit according to the invention in a three dimensional view.

FIG. 1 shows an accelerator pedal according to the invention in a three dimensional view.

The accelerator pedal unit according to the invention comprises a rotatably mounted accelerator pedal 1, an actuator 2 and a control shaft 3 via which the actuator 2 can transmit a restoring torque to the accelerator pedal 1. In this way, the accelerator pedal unit can take on functions, such as, for example, actively limiting the speed of a vehicle or indicating that the speed limit is being exceeded.

The accelerator pedal 1 is mounted so as to be rotatable about a rotational axis 4 and has a first lever arm 5 which can be actuated by foot and a second lever arm 6 which can be actuated by means of the actuator 2. The first lever arm 5 and the second lever arm 6 lie on opposite sides in relation to the rotational axis 4. The actuator 2 is, for example, a direct current motor, DC motor or brushless motor.

The control shaft 3 is rotatably mounted, for example in at least one pivot bearing.

Provision is made according to the invention for the torque of the control shaft 3 to be transmitted via a damping element 10 to the accelerator pedal 1. In this way, the control shaft 3 exerts a predefined restoring force on the accelerator pedal 1 when current is passed through the actuator 2. The damping element 10 is designed as a helical spring according to the exemplary embodiment, can, however, also be a torsion spring, flexible spring or rubber spring. When designed as a helical spring, the damping element 10 extends around control shaft 3 with at least one winding and is therefore disposed and supported on the control shaft 3. According to the exemplary embodiment, the damping element 10 has a spring stiffness in a range between 30 Nmm/degree and 80 Nmm/degree. In the case of a helical spring, the damping element 10 extends helically or in a thread-like manner around the control shaft.

A control lever 11 which transmits the torque to the accelerator pedal 1 is provided on the control shaft 3, wherein the damping element 10 is connected at one end to the control lever 11 and at the other end to the control shaft 3. According to the exemplary embodiment, the damping element 10 is connected to the control shaft 3 at the other end. The control lever 11 is arranged on the control shaft 3 in a rotatably mounted manner, for example by the control shaft 3 protruding through an opening in the control lever. In this way, it is ensured that the torque is transmitted exclusively via the damping element 10 and not directly from the control shaft 3 to the accelerator pedal 1.

The damping element 10 is inserted with the end thereof associated with the control lever 11, for example, into an opening of the control lever 11 or is hooked into a receiving area. With the end thereof associated with the control shaft 3, the damping element 10 is, for example, attached to a shoulder 12 that is connected to the control shaft 3 in a rotationally fixed manner or, respectively, to a control arm 12 that is connected to said control shaft 3 in a rotationally fixed manner. According to the exemplary embodiment, the shoulder or, respectively, the control arm 12 is a separate, disk-shaped or plate-shaped component which is attached on the control shaft 3 in a rotationally fixed manner, for example in a positive locking and force-fitting manner. Of course, the shoulder can, however, also be connected to the control shaft 3 in a materially bonded manner. The shoulder 12 can also be omitted, and the dampening element 10 can be directly attached to the control shaft 3. The damping element 10 is, for example, inserted into an opening 13 of the shoulder 12 with the end thereof facing said shoulder 12 or is hooked into a receiving area. A rotatably mounted rolling element 16 can be provided on the control lever 11, said rolling element acting on a surface of the second lever arm 6 of the accelerator pedal 1. The surface 17 can be provided with a predefined coating in order to reduce the friction between said surface 17 of the accelerator pedal 1 and the rolling element 16 of the control lever 11.

A positioning spring 20 can be provided which is attached with the one end thereof to a rotationally fixed housing section 21 and acts with the other end thereof on the control lever 11. The positioning spring 20 is arranged, for example, like the damping element 10 on the control shaft 3 and is designed, for example, as a helical spring or as a spiral spring. The positioning spring 20 extends helically or in a thread-like manner around the control shaft 3 in the case of a helical spring and spirally in the case of a spiral spring. The spiral spring requires very little installation space in the axial direction with respect to the control shaft 3. An unspecified noise and/or vibration dampening element can be provided on the positioning spring 20 which fits snugly against said positioning spring 20.

The housing section 21 is, for example, formed by a so-called bearing bracket with which the accelerator pedal unit is attached to a vehicle. The positioning spring 20 can be designed in such a manner that said spring pushes the control lever 11 either towards the accelerator pedal 1 or in the opposite direction into a stop position that is spaced apart from said accelerator pedal 1. According to the first alternative, the positioning spring 20 acts as a restoring spring against the spring force of the damping element 10. According to the second alternative, the positioning spring 10 acts in the direction of the damping element 10 and ensures that the control lever 11 is constantly in contact with the accelerator pedal 1, whereby the actuator 2 can very quickly introduce a force into the accelerator pedal 1. In both cases, the positioning spring 20 is installed with an elastic preload. The positioning spring 20 is, for example, inserted with the one end thereof into an opening of the housing section 21 and, for example, loosely rests under preload with the other end thereof against the control lever 11.

The damping element 10 and the positioning spring 20 can each be disposed on a bearing bushing 22 that is rotatably mounted on the control shaft 3. The bearing bushing of the positioning spring 20 can also be integrally formed with the control lever 11. The bearing bushing 22 can also in each case be omitted and the diameter of the control shaft 3 can be designed in such a manner that said control shaft 3 itself takes on the guidance and support of the springs 10, 20.

In addition, a gearing mechanism 24 can be provided between the actuator 2 and the control shaft 3, said gearing mechanism transmitting the rotational movement of the actuator 2 with a predefined speed reduction. The positioning spring ensures a bracing of the gearing mechanism 24 independently of the effective direction thereof; thus preventing a tooth flank change in the gearing mechanism 24. In so doing, there is little noise during the operation of the gearing mechanism.

The gearing mechanism 24 is, for example, a spur gear unit or a worm gear, wherein the worm gear can be of self-locking or non-self-locking design. The damping element is designed in such a manner that the accelerator pedal 1 can still be moved at least by 5 degrees in the event of a blockage of the gearing mechanism. This enables an emergency operation of the vehicle. The damping element 10 is thus not allowed to go solid within these at least 5 degrees. When the accelerator pedal is actuated while the gearing mechanism 24 is blocked, a torque is exerted by the accelerator pedal 1 on the damping element 10 so that said element is deformed.

Figure 2:
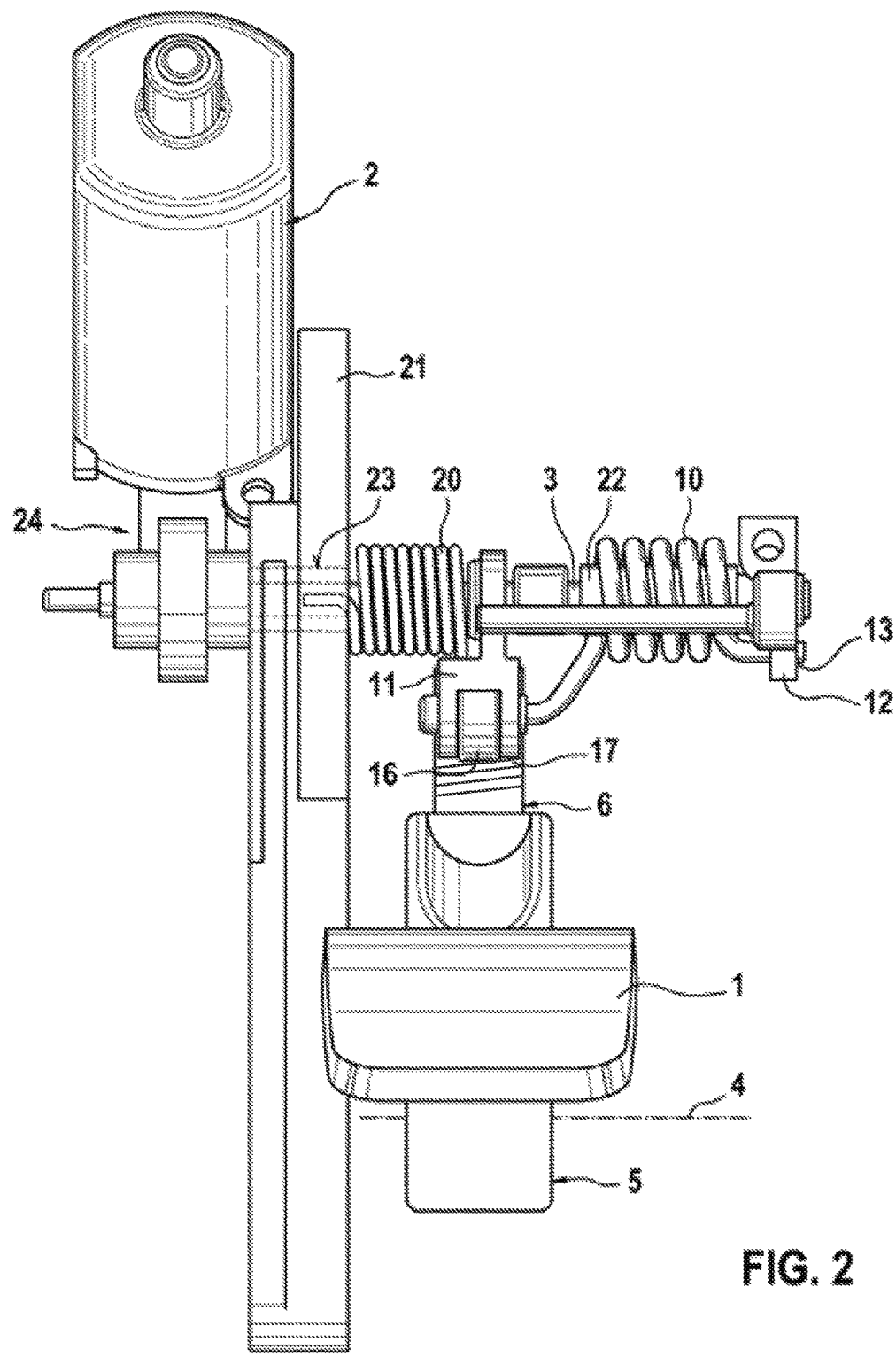
FIG. 2 shows a top view of the inventive accelerator pedal unit according to FIG. 1.

FIG. 2 shows a view from above onto the inventive accelerator pedal unit according to FIG. 1.

In the accelerator pedal unit according to FIG. 2, the parts which remain the same or act the same with respect to the accelerator pedal unit according to FIG. 1 are denoted with the same reference signs.

The actuator 2 and the gearing mechanism 24 are disposed according to the exemplary embodiment on the side of the housing section 21 that faces away from the accelerator pedal 1, wherein the control shaft 3 protrudes via a through-hole through the housing section 21. Provision is, for example, made for the control shaft 3 to be rotationally mounted in the through-hole.

What is claimed is:

1. An accelerator pedal unit comprising
   an accelerator pedal (1);
   an actuator (2);
   a gearing mechanism (24) provided between the actuator (2) and the accelerator pedal (1);
   a control lever (11);
   a control shaft (3) via which the actuator (2) is configured to transmit a restoring torque to the accelerator pedal (1), wherein a first torque of the control shaft (3) is transmitted to the accelerator pedal (1) via a damping element (10) and the control lever (11);
   a rotationally fixed housing section (21); and
   a positioning spring (20) which is attached with a first end to the housing section (21) and acts with a second end, which is opposite the first end, on the control lever (11).

2. The accelerator pedal unit according to claim 1, characterized in that the control lever (11) is provided on the control shaft (3), wherein the damping element (10) includes a first end that is connected to the control lever (11) and a second end, which is opposite the first end, that is connected to the control shaft (3).

3. The accelerator pedal unit according to claim 2, characterized in that the control lever (11) is rotatably mounted on the control shaft (3).

4. The accelerator pedal unit according to claim 2, characterized in that the second end of the damping element (10) is attached to a shoulder (12), and wherein the shoulder (12) is connected to the control shaft (3).

5. The accelerator pedal unit according to claim 1, characterized in that the damping element (10) is formed as one of a helical spring, torsion spring, flexible spring or rubber spring.

6. The accelerator pedal unit according to claim 1, characterized in that the damping element (10) extends around the control shaft (3) with at least one winding.

7. The accelerator pedal unit according to claim 1, characterized in that the control lever (11) has a rotatably mounted rolling element (16).

8. The accelerator pedal unit according to claim 1, characterized in that the control lever (11) acts on a surface (17) of the accelerator pedal (1), said surface having a coating.

9. The accelerator pedal unit according to claim 1, characterized in that the positioning spring (20) is configured to push the control lever (11) towards the accelerator pedal (1) or in the opposite direction into a stop position that is spaced apart from the accelerator pedal (1).

10. The accelerator pedal unit according to claim 1, characterized in that the damping element (10) and the positioning spring (20) are in each case provided on a bearing bushing (22) that is rotatably mounted on the control shaft (3).

11. The accelerator pedal unit according to claim 1, wherein the positioning spring (20) pushes the control lever (11) towards the accelerator pedal (1).

12. The accelerator pedal unit according to claim 1, wherein the positioning spring (20) pushes the control lever (11) away from the accelerator pedal (1) into a stop position that is spaced apart from the accelerator pedal (1).

* * * * *